United States Patent
Tsukamoto

(10) Patent No.: US 7,469,240 B2
(45) Date of Patent: Dec. 23, 2008

(54) DOCUMENT CLASSIFICATION PROGRAM, VECTOR TRANSFORMATION PROGRAM, LEXICAL-DISTORTION CANCELLATION PROGRAM, DOCUMENT CLASSIFICATION METHOD, AND DOCUMENT CLASSIFICATION APPARATUS

(75) Inventor: Koji Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 436 days.

(21) Appl. No.: 11/192,408

(22) Filed: Jul. 29, 2005

(65) Prior Publication Data

US 2006/0294099 A1    Dec. 28, 2006

(30) Foreign Application Priority Data

Apr. 20, 2005    (JP)    ............................. 2005-122298

(51) Int. Cl.
*G06F 17/00* (2006.01)
*G06N 5/02* (2006.01)

(52) U.S. Cl. ........................................................ 706/48
(58) Field of Classification Search ................ None
See application file for complete search history.

(56) References Cited

U.S. PATENT DOCUMENTS

| | | | | | |
|---|---|---|---|---|---|
| 5,210,820 | A | * | 5/1993 | Kenyon ...................... | 704/200 |
| 5,280,562 | A | * | 1/1994 | Bahl et al. ................... | 704/200 |
| 5,915,250 | A | * | 6/1999 | Jain et al. .................... | 707/100 |
| 6,006,175 | A | * | 12/1999 | Holzrichter ................. | 704/208 |
| 6,567,797 | B1 | * | 5/2003 | Schuetze et al. .............. | 707/2 |
| 6,941,321 | B2 | * | 9/2005 | Schuetze et al. ........ | 707/103 R |
| 7,065,488 | B2 | * | 6/2006 | Yajima et al. ............... | 704/255 |
| 7,068,723 | B2 | * | 6/2006 | Foote et al. ............ | 375/240.25 |
| 7,280,694 | B2 | * | 10/2007 | Kim et al. .................... | 382/181 |
| 7,391,889 | B2 | * | 6/2008 | Kim et al. .................... | 382/118 |
| 7,409,108 | B2 | * | 8/2008 | Xu et al. ..................... | 382/294 |
| 2001/0026634 | A1 | * | 10/2001 | Yamaguchi ................. | 382/118 |

OTHER PUBLICATIONS

A feature selection algorithm with redundancy reduction for text classification Saleh, S.N.; El Sonbaty, Y.; Computer and Information Sciences, 2007. ISCIS 2007. 22nd International International Symposium on Nov. 7-9, 2007 pp. 1-6 Digital Object Identifier 10.1109/ISCIS.2007.4456849.*

Ranking and selecting terms for text categorization via SVM discriminate boundary Tien-Fang Kuo; Yajima, Y.; Granular Computing, 2005 IEEE International Conference on vol. 2, Jul. 25-27, 2005 pp. 496-501 vol. 2 Digital Object Identifier 10.1109/GRC.2005.1547341.*

Forensic Analysis of Document Fragment Based on SVM Binglong Li; Qingxian Wang; Junyong Luo; Intelligent Information Hiding and Multimedia Signal Processing, 2006. IIH-MSP '06. International Conference on Dec. 2006 pp. 236-239 Digital Object Identifier 10.1109/IIH-MSP.2006.264988.*

(Continued)

*Primary Examiner*—Michael B. Holmes
(74) *Attorney, Agent, or Firm*—Staas & Halsey LLP

(57) ABSTRACT

A classification-rule generating unit generates a classification rule for classifying documents in a second domain into categories in a first domain, by using a plurality of feature vectors that is extracted from a plurality of documents in the first domain and transformed into a plurality of feature vectors in the second domain. A classifying unit classifies the documents in the second domain into the categories in the first domain based on the classification rule generated.

14 Claims, 14 Drawing Sheets

OTHER PUBLICATIONS

Encoding of modified X-Y trees for document classification Cesarini, F.; Lastri, M.; Marinai, S.; Soda, G.; Document Analysis and Recognition, 2001. Proceedings. Sixth International Conference on Sep. 10-13, 2001 pp. 1131-1136 Digital Object Identifier 10.1109/ICDAR.2001.953962.*

A rough set-based hybrid method to text categorization Yonguang Bao; Aoyama, S.; Xiaoyong Du; Yamada, K.; Ishii, N.; Web Information Systems Engineering, 2001. Proceedings of the Second International Conference on vol. 1, Dec. 3-6, 2001 pp. 254-261 vol. 1.*

* cited by examiner

FIG.5

MATRIX CREATED BY REPRESENTATIVE FEATURE VECTORS IN PATENT
DOCUMENTS AND MATRIX CREATED BY REPRESENTATIVE FEATURE VECTORS
IN PAPERS ARE DESIGNATED AS P AND Q, RESPECTIVELY

REPRESENTATIVE
FEATURE VECTORS IN
CATEGORY "DISPLAY
DEVICE" OF PATENT
DOCUMENTS w1 COMPUTER
w2 INFORMATION DEVICE
w3 DISPLAY
w4 MOUSE
w5 WINDOW
w6 HEAD
..

CATEGORIES

|  | DISPLAY DEVICE | STORAGE DEVICE | INTERFACE | ... |
|---|---|---|---|---|
|  | 0.8 | 0.7 | 0.5 |  |
|  | 3.2 | 2.5 | 4.4 |  |
|  | 1.4 | 0.3 | 1.2 |  |
|  | ... | ... | ... |  |

P

CATEGORIES

|  | DISPLAY DEVICE | STORAGE DEVICE | INTERFACE | ... |
|---|---|---|---|---|
|  | 2.8 | 3.7 | 5.5 |  |
|  | 0.2 | 0.5 | 0.2 |  |
|  | 5.2 | 2.2 | 4.4 |  |
|  | ... | ... | ... |  |

Q

OBJECT: TO OBTAIN MATRIX M SATISFYING Q=MP
M SHIFTS REPRESENTATIVE POINTS IN RESPECTIVE CATEGORIES IN
PATENT DOMAIN TO REPRESENTATIVE POINTS IN PAPER DOMAIN (FOR
DISPLAY DEVICE, SHIFTS (0.8, 3.2, 1.4, ...) TO (2.8, 0.2, 5.2, ...)).

METHOD: DESIGNATE TRANSFORMATION MATRIX M AS $M=Q(P^T P)^{-1} P^T$

MATRIX OBTAINED BY COORDINATE-TRANSFORMATION-RULE GANERATING UNIT IS DESIGNATED AS M.
BY USING M, VECTORS EXPRESSING PATENT DOCUMENT ARE TRANSFORMED TO FEATURE SPACE OF PAPERS.

FIG.10
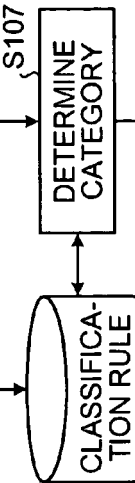
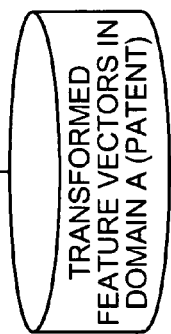
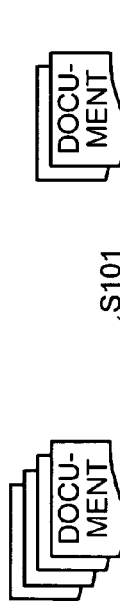
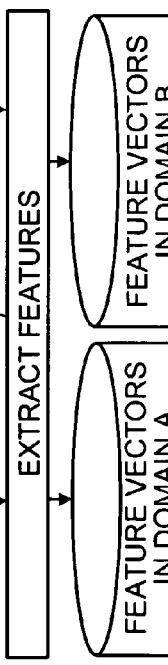
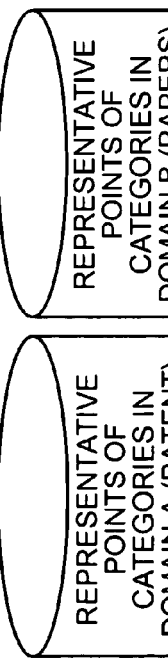
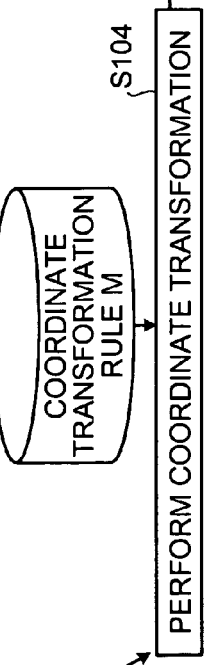

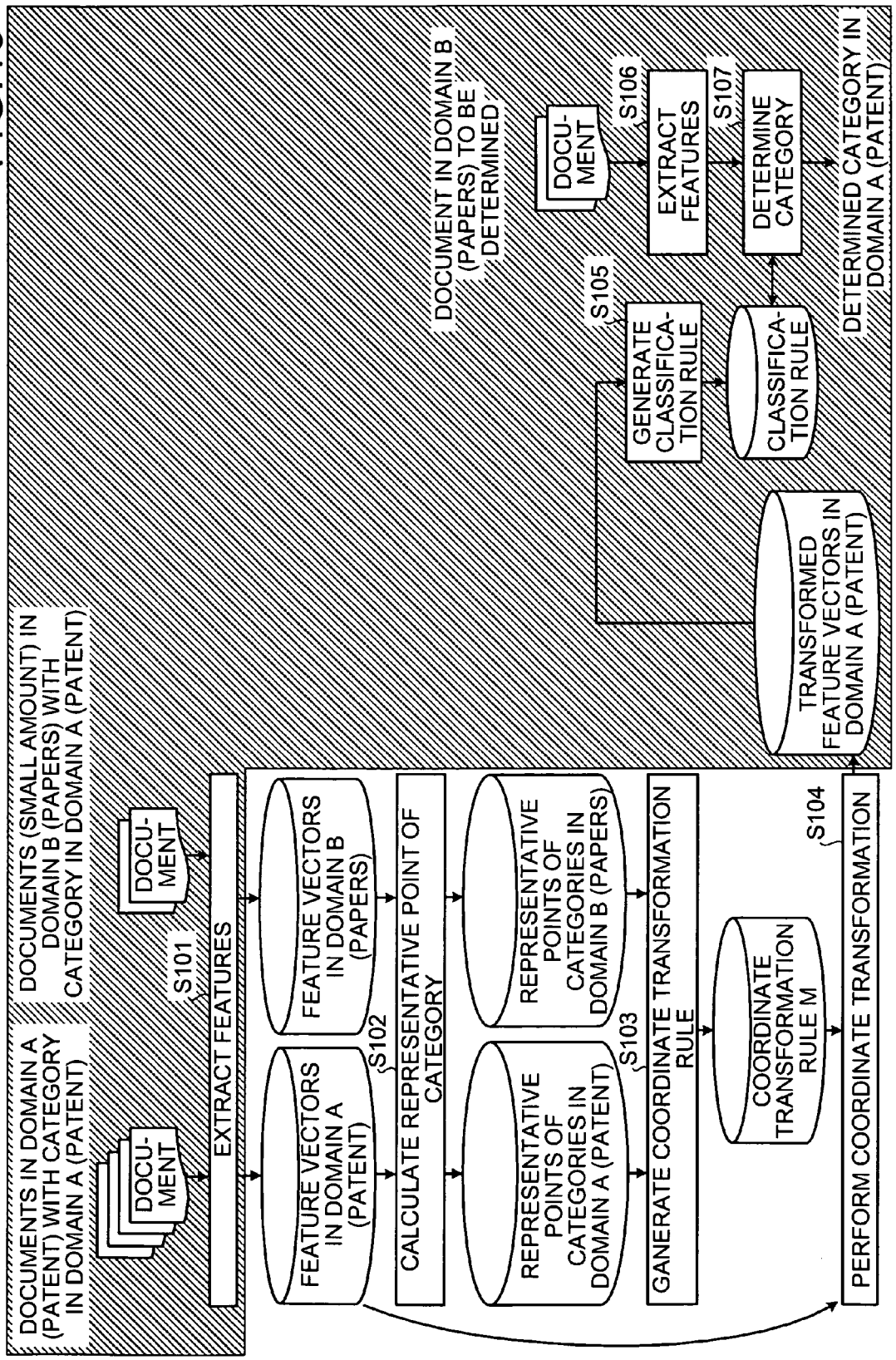

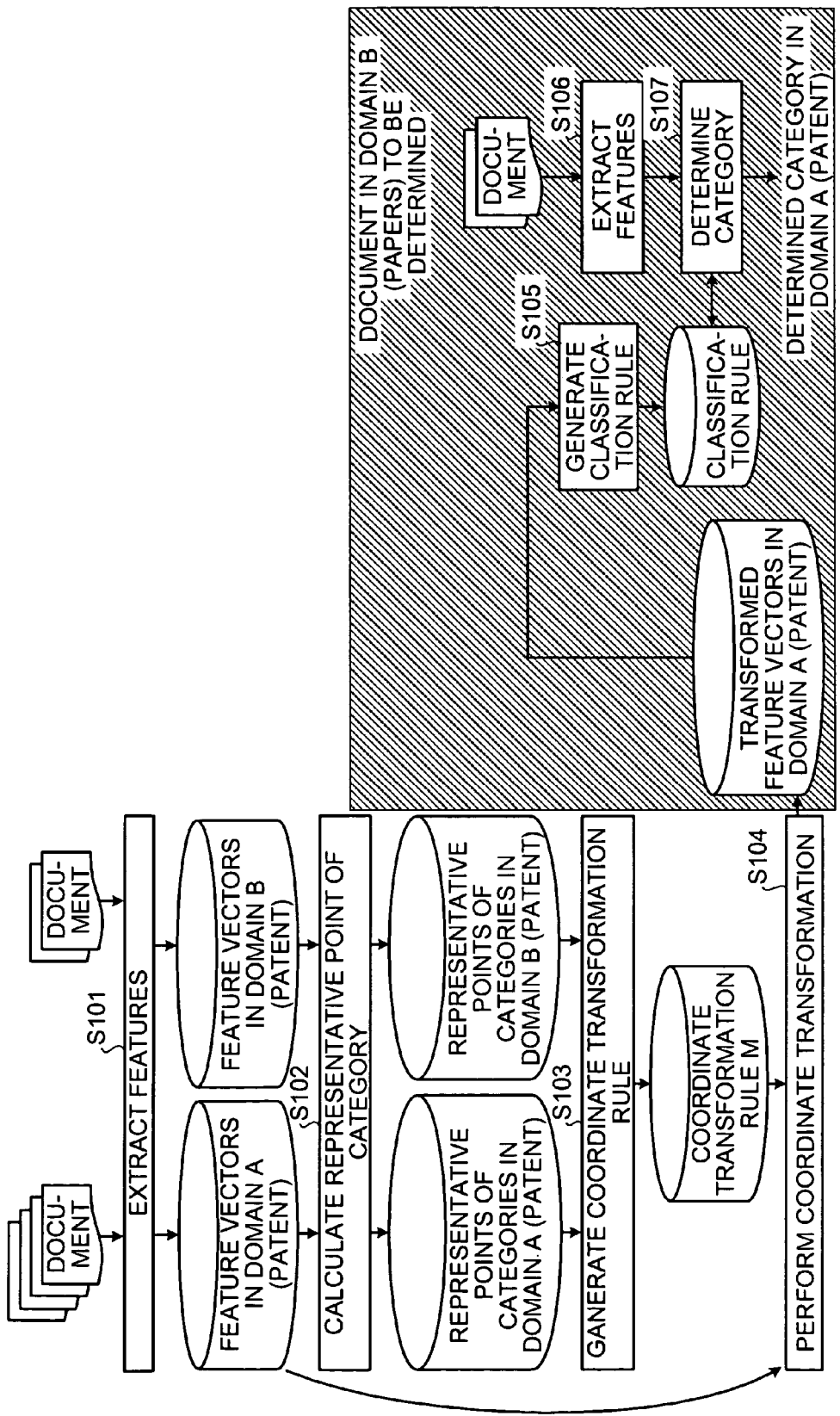

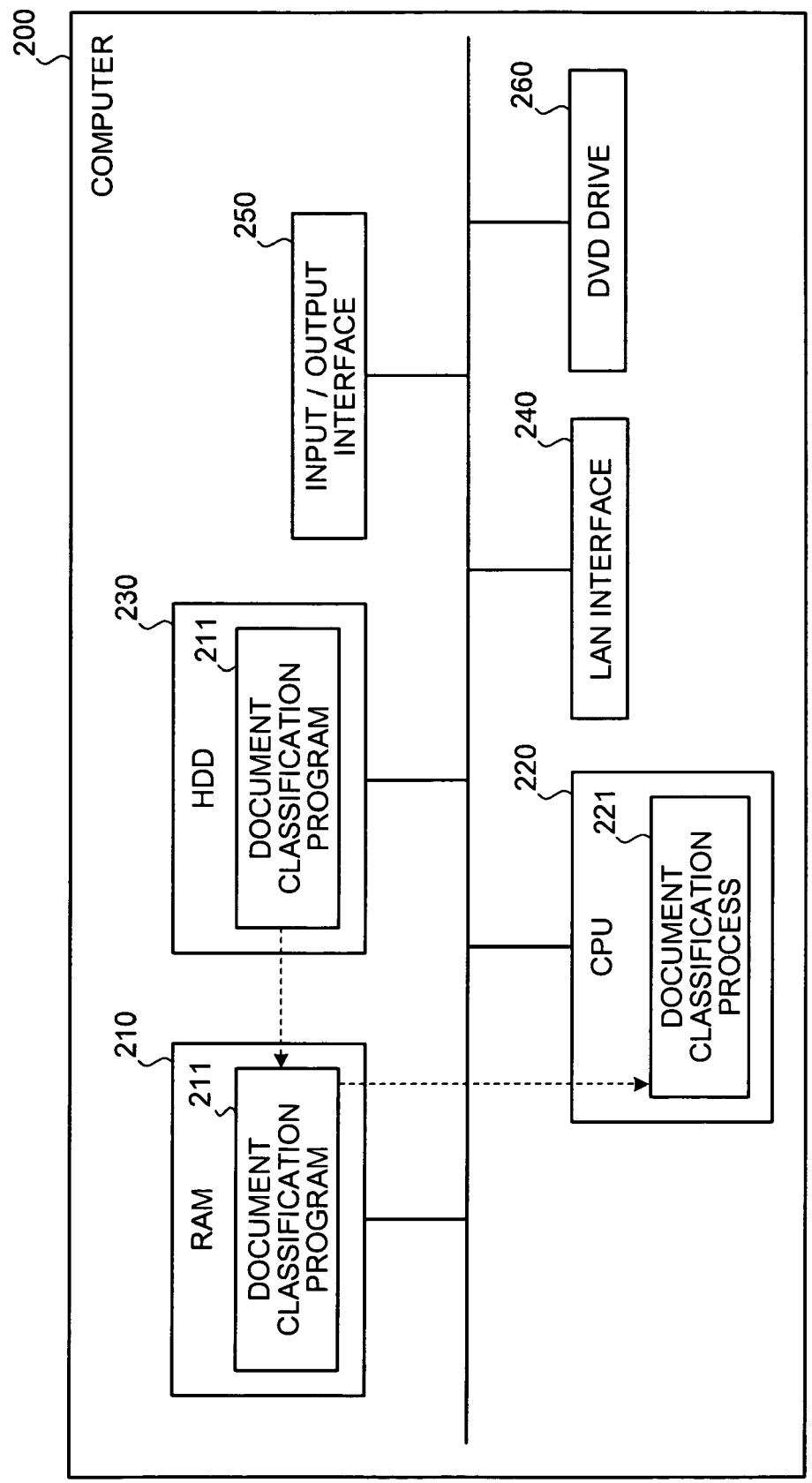

DOCUMENT CLASSIFICATION PROGRAM, VECTOR TRANSFORMATION PROGRAM, LEXICAL-DISTORTION CANCELLATION PROGRAM, DOCUMENT CLASSIFICATION METHOD, AND DOCUMENT CLASSIFICATION APPARATUS

BACKGROUND OF THE INVENTION

1. Field of the Invention

The present invention relates to a document classification program, a document classification method, and a document classification apparatus that classify documents in a second domain according to categories for classifying documents in a first domain. More particularly, the invention relates to a document classification program, a document classification method, a document classification apparatus that perform highly accurate classification at a low cost, and a vector transformation program and a lexical-distortion cancellation program applied to the document classification program. In the specification, patent documents are explained as the documents in the first domain, and papers are explained as the documents in the second domain. That is, classification of papers according to International Patent Classification (IPC) will be explained.

2. Description of the Related Art

A method of classifying documents in which a classification rule is learnt from classified correct solution data to classify documents by using the classification rule is widely used from the viewpoint of efficiency (see, for example, Japanese Patent Application Laid-Open No. 2002-222083). When classifying papers according to the IPC by using such a method, the procedure will be either one of the following two procedures.

1. When the patent documents are used as the correct solution data:

creating a classification rule from the correct solution data (patent documents) by using a learning machine; and classifying papers by using the classification rule.

2. When papers added with IPC are used as the correct solution data:

classifying the papers manually according to the IPC;

creating a classification rule from the correct solution data (papers) by using the learning machine; and classifying the papers by using the classification rule.

However, when the patent documents are used as the correct solution data, there is a large number of patent documents classified according to the IPC, but since the lexis (the way how the words are used) is different between the patent documents and the papers, the papers may not be able to be classified successfully even if learning is performed from the patent documents. Further, when the papers added with the IPC are used as the correct solution data, the cost for pre-creating the correct solution of the papers classified according to the IPC is high, and hence, a large number of classified patent documents cannot be used effectively.

Generally, when cases in a domain B is classified according to categories of a domain A, even if there is a large number of cases in the domain A classified according to categories of the domain A, since the domain A and the domain B are different, documents pre-classified in the domain A cannot be effectively used, and the correct solution cases must be created by using the documents in the domain B.

SUMMARY OF THE INVENTION

It is an object of the present invention to at least solve the problems in the conventional technology.

A computer-readable recording medium according to one aspect of the present invention stores a computer program for classifying documents in a second domain according to categories for classifying documents in a first domain. The computer program causes a computer to execute generating a classification rule for classifying the documents in the second domain into the categories in the first domain, by using a plurality of feature vectors that is extracted from a plurality of documents in the first domain and transformed into a plurality of feature vectors in the second domain; and classifying the documents in the second domain into the categories in the first domain based on the classification rule generated.

A computer-readable recording medium according to another aspect of the present invention stores a computer program for transforming vectors in a first domain classified into a plurality of categories into vectors in a second domain classified into the categories. The computer program causes a computer to execute calculating a representative vector representing a category from a plurality of vectors classified as the same category in the first and the second domains; generating a transformation rule for transforming the vectors in the first domain into the vectors in the second domain by using the representative vector calculated for each of the categories in the first and the second domains; and transforming the vectors in the first domain into the vectors in the second domain by using the transformation rule generated.

A computer-readable recording medium according to still another aspect of the present invention stores a computer program for transforming lexical vectors in a first domain classified into a plurality of categories into lexical vectors in a second domain classified into the categories. The computer program causes a computer to execute extracting a plurality of lexical vectors for each of the categories from a plurality of documents belonging to each of the categories in the first and the second domains; calculating a representative lexical vector representing each of the categories from the lexical vectors extracted in each of the categories in the first and the second domains; generating a transformation rule for transforming the lexical vectors in the first domain into the lexical vectors in the second domain by using the representative lexical vector calculated for each of the categories in the first and the second domains; and transforming the lexical vectors in the first domain into the lexical vectors in the second domain by using the transformation rule generated.

A method according to still another aspect of the present invention, which is for classifying documents in a second domain according to categories for classifying documents in a first domain, includes generating a classification rule for classifying the documents in the second domain into the categories in the first domain, by using a plurality of feature vectors that is extracted from a plurality of documents in the first domain and transformed into a plurality of feature vectors in the second domain; and classifying the documents in the second domain into the categories in the first domain based on the classification rule generated.

A method according to still another aspect of the present invention, which is for transforming vectors in a first domain classified into a plurality of categories into vectors in a second domain classified into the categories, includes calculating a representative vector representing a category from a plurality of vectors classified as the same category in the first and the second domains; generating a transformation rule for transforming the vectors in the first domain into the vectors in the second domain by using the representative vector calculated for each of the categories in the first and the second domains; and transforming the vectors in the first domain into the vectors in the second domain by using the transformation rule generated.

A method according to still another aspect of the present invention, which is for transforming lexical vectors in a first domain classified into a plurality of categories into lexical vectors in a second domain classified into the categories, includes extracting a plurality of lexical vectors for each of the categories from a plurality of documents belonging to each of the categories in the first and the second domains; calculating a representative lexical vector representing each of the categories from the lexical vectors extracted in each of the categories in the first and the second domains; generating a transformation rule for transforming the lexical vectors in the first domain into the lexical vectors in the second domain by using the representative lexical vector calculated for each of the categories in the first and the second domains; and transforming the lexical vectors in the first domain into the lexical vectors in the second domain by using the transformation rule generated.

An apparatus according to still another aspect of the present invention, which is for classifying documents in a second domain according to categories for classifying documents in a first domain, includes a classification-rule generating unit that generates a classification rule for classifying the documents in the second domain into the categories in the first domain, by using a plurality of feature vectors that is extracted from a plurality of documents in the first domain and transformed into a plurality of feature vectors in the second domain; and a classifying unit that classifies the documents in the second domain into the categories in the first domain based on the classification rule generated.

An apparatus according to still another aspect of the present invention, which is for transforming vectors in a first domain classified into a plurality of categories into vectors in a second domain classified into the categories, includes a representative-vector calculating unit that calculates a representative vector representing a category from a plurality of vectors classified as the same category in the first and the second domains; a transformation-rule generating unit that generates a transformation rule for transforming the vectors in the first domain into the vectors in the second domain by using the representative vector calculated for each of the categories in the first and the second domains; and a transforming unit that transforms the vectors in the first domain into the vectors in the second domain by using the transformation rule generated.

An apparatus according to still another aspect of the present invention, which is for transforming lexical vectors in a first domain classified into a plurality of categories into lexical vectors in a second domain classified into the categories, includes a lexis extracting unit that extracts a plurality of lexical vectors for each of the categories from a plurality of documents belonging to each of the categories in the first and the second domains; a representative-lexical-vector calculating unit that calculates a representative lexical vector representing each of the categories from the lexical vectors extracted in each of the categories in the first and the second domains; a transformation-rule generating unit that generates a transformation rule for transforming the lexical vectors in the first domain into the lexical vectors in the second domain by using the representative lexical vector calculated for each of the categories in the first and the second domains; and a transforming unit that transforms the lexical vectors in the first domain into the lexical vectors in the second domain by using the transformation rule generated.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is specific example of a coordinate transformation rule generated by the coordinate-transformation-rule generating unit;

FIG. 10 is a flowchart of the processing procedure of document classification processing by the document classification apparatus according to the present embodiment;

FIG. 13 is an explanatory diagram of a vector transforming apparatus;

FIG. 14 is an explanatory diagram of a lexical-distortion canceling device; and

FIG. 15 is a block diagram of a configuration of a computer for executing a document classification program according to the present embodiment.

DETAILED DESCRIPTION OF THE PREFERRED EMBODIMENTS

Exemplary embodiments of the present invention will be explained in detail with reference to the accompanying drawings.

A document classification apparatus according to the present embodiment classifies documents (papers) in a domain B according to categories (IPC) of a domain A (patent). The document classification apparatus according to the present embodiment once converts the documents belonging to the domain A to be expressed by the lexis used in the domain B, and uses this for learning and classification as a pseudo correct solution data (the one that uses the lexis of the domain B but has categories of the domain A). As a result, a large number of documents in the domain A can be used as the correct solutions for the domain B, thereby reducing the required quantities of the correct solutions for the domain B created manually.

Specifically, the document classification apparatus according to the present embodiment classifies the documents in the following procedure.

(1) Classify a few documents in the domain B manually according to the categories of the domain A.
(2) Generate a lexical transformation rule (coordinate transformation rule) M for transforming the lexis used in the domain A into the lexis used in the domain A, by using the documents in the domain B classified by (1), and the documents in the domain A classified according to the categories of the domain A.
(3) Transform the documents in the domain A into the documents in the domain B by using M. The documents obtained by this transformation have a classification system of the domain A and the lexis of the domain B.
(4) Obtain a classification rule for classifying the documents in the domain B to the classification system of the domain A, by learning the documents transformed by (3) as the correct solution.
(5) Classify the documents in the domain B into the categories of the domain A by using the classification rule obtained by (4).

Thus, the document classification apparatus according to the present embodiment generates the classification rule by using the documents having the lexis of the domain B and categories of the domain A as the correct solution data, thereby improving in the classification accuracy.

Figure 1:
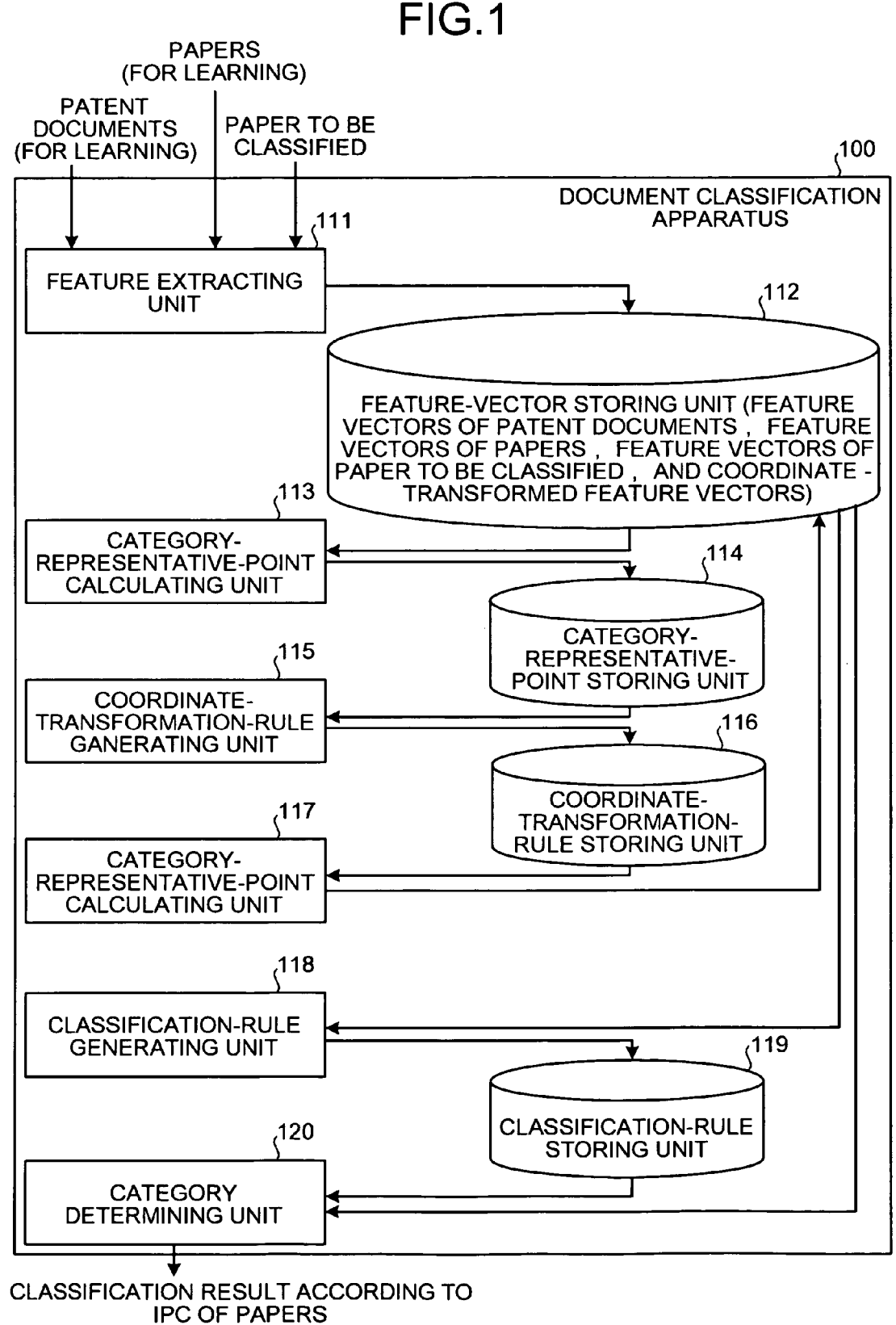
FIG. 1 is a block diagram of a configuration of a document classification apparatus according to an embodiment of the present invention.

FIG. 1 is a block diagram of the configuration of the document classification apparatus according to the present embodiment. As shown in FIG. 1, the document classification apparatus 100 includes a feature extracting unit 111, a feature-vector storing unit 112, a category representative-point calculating unit 113, a category-representative-point storing unit 114, a coordinate-transformation-rule generating unit 115, a coordinate-transformation-rule storing unit 116, a coordinate transforming unit 117, a classification-rule generating unit 118, a classification-rule storing unit 119, and a category determining unit 120.

Figure 2:
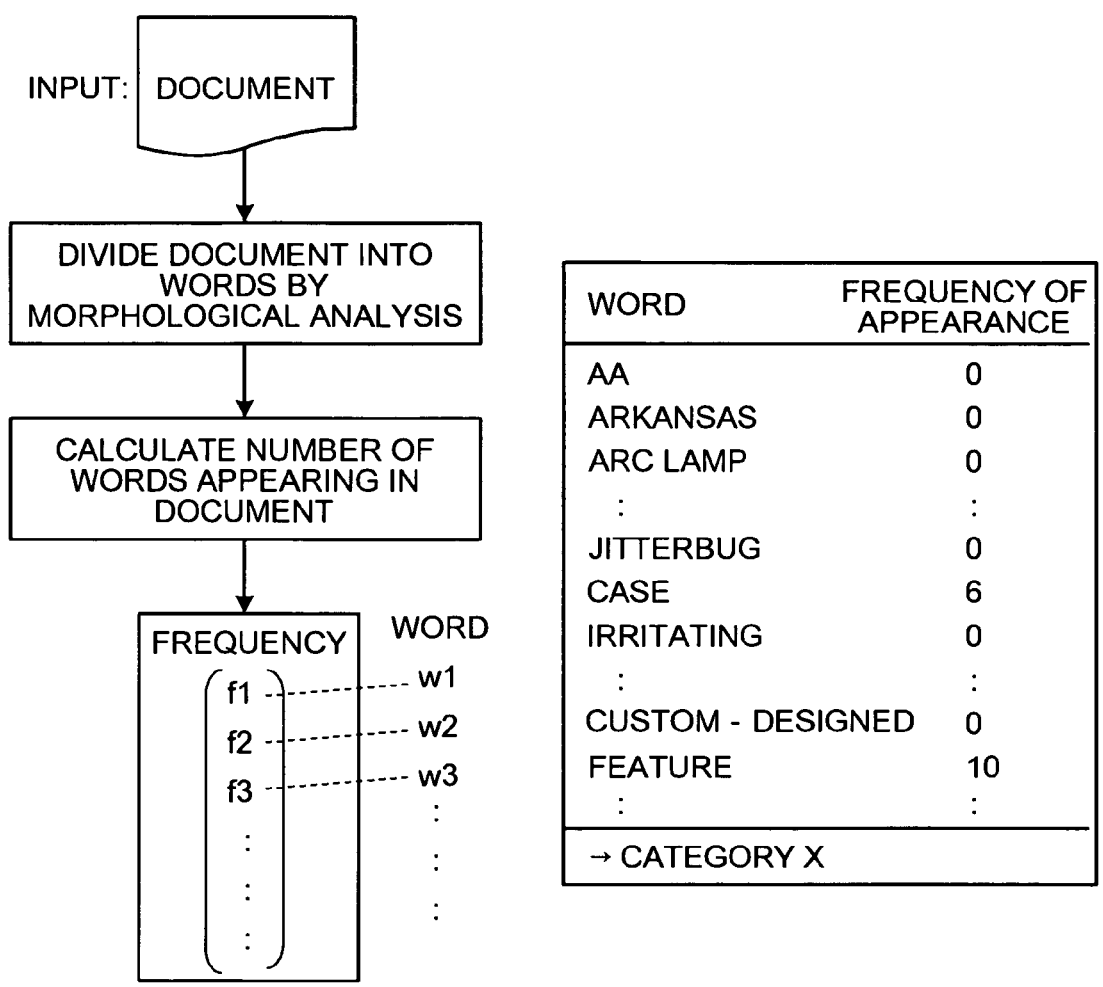
FIG. 2 is an explanatory diagram of feature extraction processing by a feature extracting unit.

The feature extracting unit 111 inputs a document to extract the feature thereof, generates a feature vector, and stores it in the feature-vector storing unit 112. FIG. 2 is an explanatory diagram of feature extraction processing by the feature extracting unit 111.

As shown in FIG. 2, the feature extracting unit 111 performs morphological analysis of the input document and divides the document into words, to count the number of words in the document. The feature extracting unit 111 then outputs a feature vector by designating the frequency fi of a word wi ($1 \leq i \leq m$, m is the number of vocabularies) as an element. That is, the feature extracting unit 111 generates a feature vector in a feature space in which the frequency of appearance of all vocabularies is plotted on a coordinate axis.

According to the present embodiment, the feature extracting unit 111 inputs patent documents, papers, and paper to be classified, and outputs a feature vector for each of them. Here, the patent documents and papers are documents for learning to be used for generating the feature vector used for learning for generating the classification rule, and the category of the document is provided as a correct solution together with the document. For example, in FIG. 2, the frequency of appearance of words such as "case" and "feature" is calculated from the document for learning in which category X is provided as the correct solution, to generate feature vectors. The paper to be classified is paper, which is classified according to the categories of the IPC by the document classification apparatus 100.

An instance in which the frequency of appearance of words is calculated by performing the morphological analysis of the document has been explained above, but the feature vector can be generated by using other methods, such as extracting a keyword from the document.

The feature-vector storing unit 112 stores the feature vector generated by the feature extracting unit 111. That is, the feature-vector storing unit 112 stores feature vectors of patent documents generated from the patent documents, feature vectors of papers generated from the papers, and feature vectors of the paper to be classified generated from the paper to be classified. The feature-vector storing unit 112 also stores coordinate-transformed feature vectors of the patent documents, which have been subjected to coordinate transformation from the patent domain into the paper domain by the coordinate transforming unit 117. When a category is added to the document, for which the feature vector has been generated, the feature-vector storing unit 112 stores the feature vector together with the category.

The category representative-point calculating unit 113 calculates a representative feature vector representing each of the categories of respective documents by using a plurality of feature vectors generated from the respective documents for each of the categories of the respective domains, and stores the calculated representative feature vectors in the category-representative-point storing unit 114. Here, the representative feature vectors of the respective categories correspond to representative points of the respective categories in the feature space.

Figure 3:
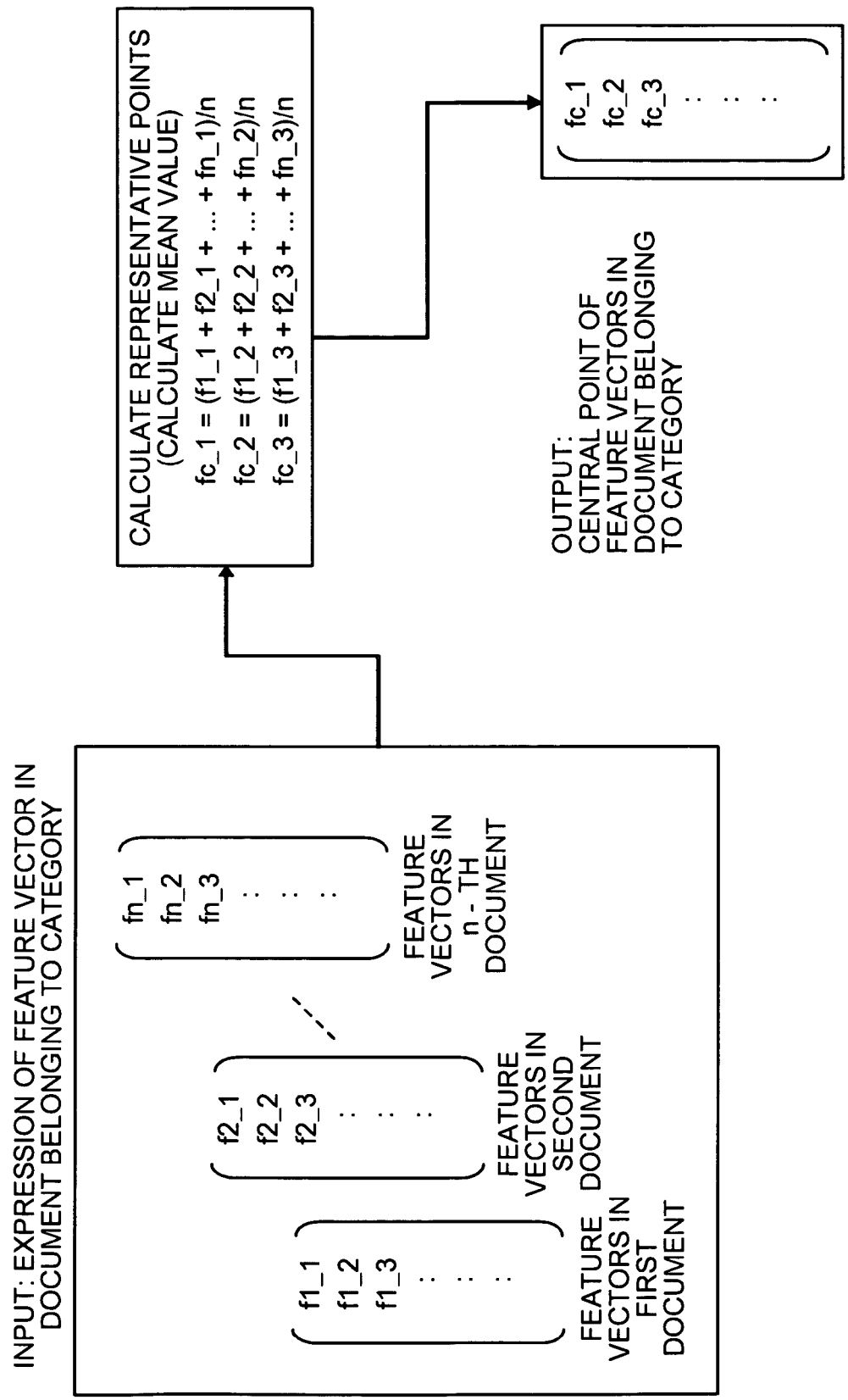
FIG. 3 is an explanatory diagram of representative-point calculation processing by a category representative-point calculating unit.

FIG. 3 is an explanatory diagram of representative-point calculation processing by the category representative-point calculating unit 113. As shown in FIG. 3, the category representative-point calculating unit 113 generates representative feature vectors, in which a mean value fc_i of the i-th elements f1_i, f2_i, ..., and fn_i of n feature vectors is used as an element. The representative feature vectors are calculated by simple arithmetic mean between feature vectors, but the representative feature vectors may be calculated by using other methods such as weighted mean.

The category-representative-point storing unit 114 stores the representative feature vectors calculated by the category representative-point calculating unit 113 for all categories in the patent domain and the paper domain.

The coordinate-transformation-rule generating unit 115 uses the representative feature vectors in the patent domain and the representative feature vectors in the paper domain to generate a rule for transforming the feature vectors of the patent documents from the patent domain into the paper domain, and stores the generated rule in the coordinate-transformation-rule storing unit 116.

Figure 4:
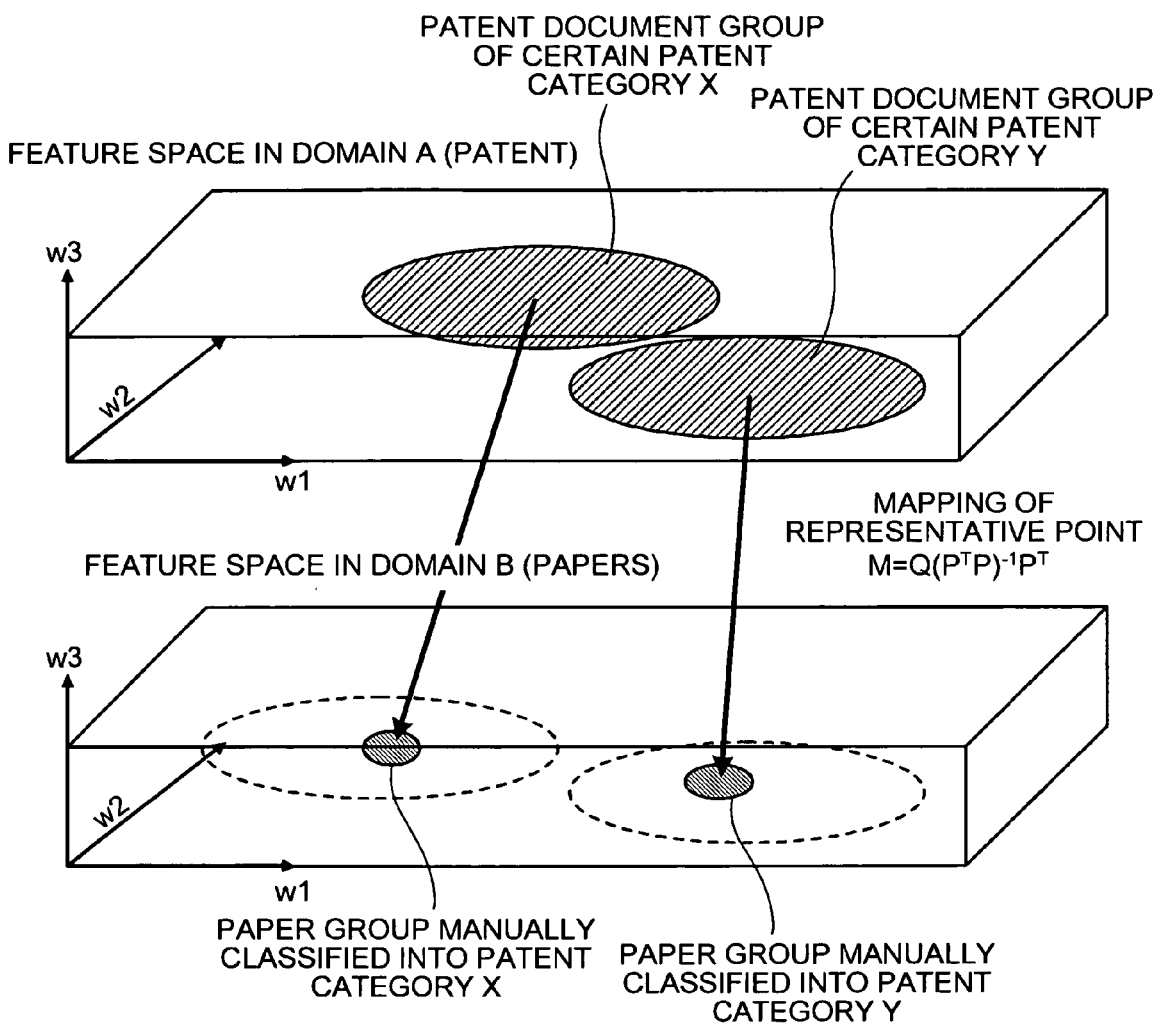
FIG. 4 is an operation conceptual diagram of a coordinate-transformation-rule generating unit.

FIG. 4 is an operation conceptual diagram of the coordinate-transformation-rule generating unit 115. As shown in FIG. 4, the coordinate-transformation-rule generating unit 115 generates a coordinate transformation rule M for transforming the feature vectors in the feature space of the domain A into the feature vectors in the feature space of the domain B.

FIG. 5 is a specific example of the coordinate transformation rule M generated by the coordinate-transformation-rule generating unit 115. As shown in FIG. 5, when it is assumed that a matrix obtained by arranging the representative feature vectors pj ($1 \leq j \leq l$, l is the number of categories) of the respective categories in the patent domain as column vectors is designated as P=(p1, p2, ..., pl), and a matrix obtained by arranging the representative feature vectors qj ($1 \leq j \leq l$, l is the number of categories) of the respective categories in the paper domain as column vectors are designated as Q=(q1, q2, ..., ql), M that satisfies Q=MP becomes the coordinate transformation rule.

Thus, M shifts the representative points corresponding to the representative feature vectors of respective categories in the feature space of the patent domain to representative points of the respective categories in the feature space of the paper domain. For example, the representative points (0.8, 3.2, 1.4, ...) in the feature space of the patent domain of a category "display device" are shifted to representative points (2.8, 0.2, 5.2, ...) in the feature space of the paper domain by M.

It is not necessary for the representative points in the feature space of the patent domain to be strictly shifted to the representative points in the feature space of the paper domain, and a method for approximately mapping the representative points in the feature space of the patent domain to the representative points in the feature space of the paper domain by some approximate calculation may be used.

M can be obtained as $$M = QP^{-1} = Q(P^T P)^{-1} P^T,$$

where T denotes transpose, and in a transposed matrix $p^T$ of matrices P, respective elements $P_{ij}$ agree with $p_{ji}$ of P. For example, when it is assumed that P is expressed as $$P = \begin{pmatrix} 0.2 & 0.8 & 0.3 & ... \\ 3.2 & 0.3 & 1.0 & ... \\ 1.4 & 0.1 & 0.8 & ... \\ \vdots & & & \end{pmatrix},$$

and $p^T$ becomes $$P^T = \begin{pmatrix} 0.2 & 3.2 & 1.4 & ... \\ 0.8 & 0.3 & 0.1 & ... \\ 0.3 & 1.0 & 0.8 & ... \\ \vdots & & & \end{pmatrix}.$$

In FIG. 4, the feature vectors of patent document groups in respective categories correspond to surrounding points of the representative point, and these points are shifted to the feature space of the patent domain to the feature space of the paper domain by M, similarly to the representative points.

The coordinate-transformation-rule storing unit 116 stores the rule for transforming the feature vectors of the patent documents from the patent domain into the paper domain, and specifically, stores the coordinate transformation rule M generated from the representative feature vectors by the coordinate-transformation-rule generating unit 115.

The coordinate transforming unit 117 uses the coordinate transformation rule generated by the coordinate-transformation-rule generating unit 115 to transform the feature vectors generated from the patent documents into the feature vectors in the paper domain, and stores the transformed feature vectors in the feature-vector storing unit 112 as coordinate-transformed feature vectors. That is, the coordinate transforming unit 117 generates feature vectors obtained by transforming the lexis in the documents in the patent domain into the lexis in the paper domain.

Figure 6:
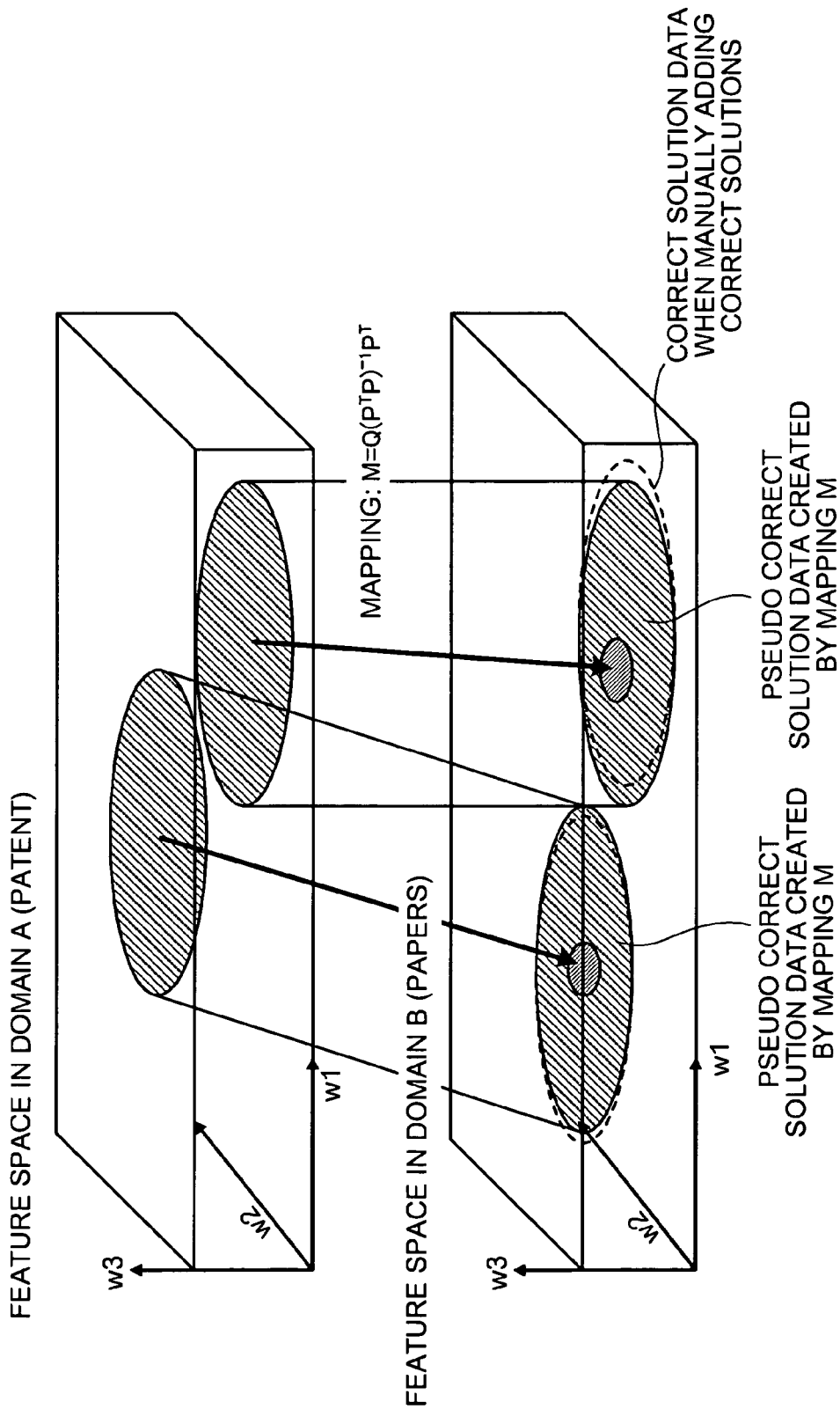
FIG. 6 is an operation conceptual diagram of a coordinate transforming unit.

FIG. 6 is an operation conceptual diagram of the coordinate transforming unit 117. As shown in FIG. 6, the coordinate transforming unit 117 shifts a point corresponding to the feature vector in the feature space of the patent domain to a point in the feature space of the paper domain.

The feature vector corresponding to the shifted point is used by the classification-rule generating unit 118 as the correct solution data when creating the classification rule. However, the correct solution data created in this manner is a pseudo correct solution data, which does not completely agree with the correct solution data created manually.

Figures 7, 8:
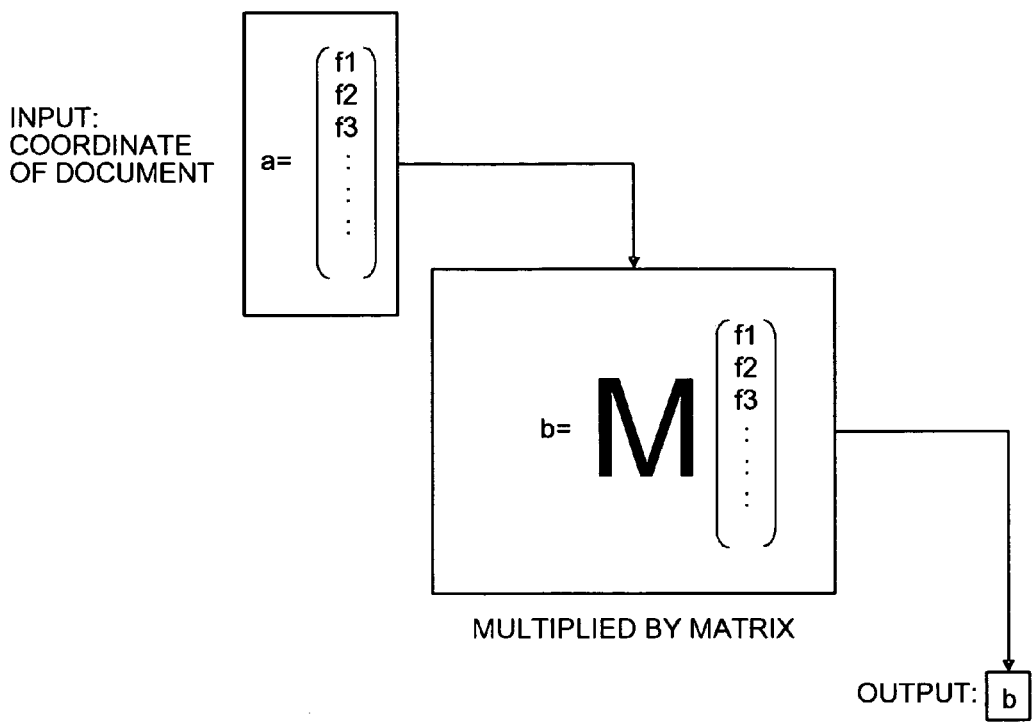
FIG. 7 is an explanatory diagram of coordinate transformation by the coordinate transforming unit.
FIG. 8 is a specific example of coordinate transformation by the coordinate transforming unit.

FIG. 7 is an explanatory diagram of coordinate transformation by the coordinate transforming unit 117. As shown in FIG. 7, the coordinate transforming unit 117 multiplies the coordinate of the document in the feature space of the patent domain, that is, a feature vector a by a matrix M to output a feature vector b in the paper domain.

FIG. 8 is a specific example of coordinate transformation by the coordinate transforming unit 117. As shown in FIG. 8, the coordinate transforming unit 117 multiplies the feature vector a=(0, 5, 1, ...) of the patent document by the matrix M to generate a feature vector b=(4.8, 1.1, 5.2, ...) of the patent document transformed into the feature space of the papers.

The classification-rule generating unit 118 uses the feature vector in the patent domain transformed into the feature vector in the paper domain by the coordinate transforming unit 117, and the category of the patent document corresponding to the feature vector as the correct solution data, to generate the classification rule for classifying the papers into the categories of the IPC, and stores the classification rule in the classification-rule storing unit 119.

Since the classification-rule generating unit 118 uses the feature vector in the patent domain transformed into the feature vector in the paper domain as the correct solution data, instead of the feature vector in the patent domain, to generate the classification rule for classifying the papers into the categories of the IPC, the papers can be classified into the categories of the IPC highly accurately.

The classification-rule storing unit 119 stores the classification rule generated by the classification-rule generating unit 118. The classification rule stored in the classification-rule storing unit 119 is used by the category determining unit 120.

The category determining unit 120 uses the classification rule generated by the classification-rule generating unit 118 to determine the category of the paper to be determined from the feature vector of the paper, and outputs the determination result.

As a specific realization method of the pair of the classification-rule generating unit 118 and the category determining unit 120, many methods such as Bayes algorithm, decision tree algorithm, support vector machine (SVM), boosting, Nearest Neighbor method (NN method), and discriminant analysis have been developed. Here, the NN method will be explained as an example.

Figure 9:
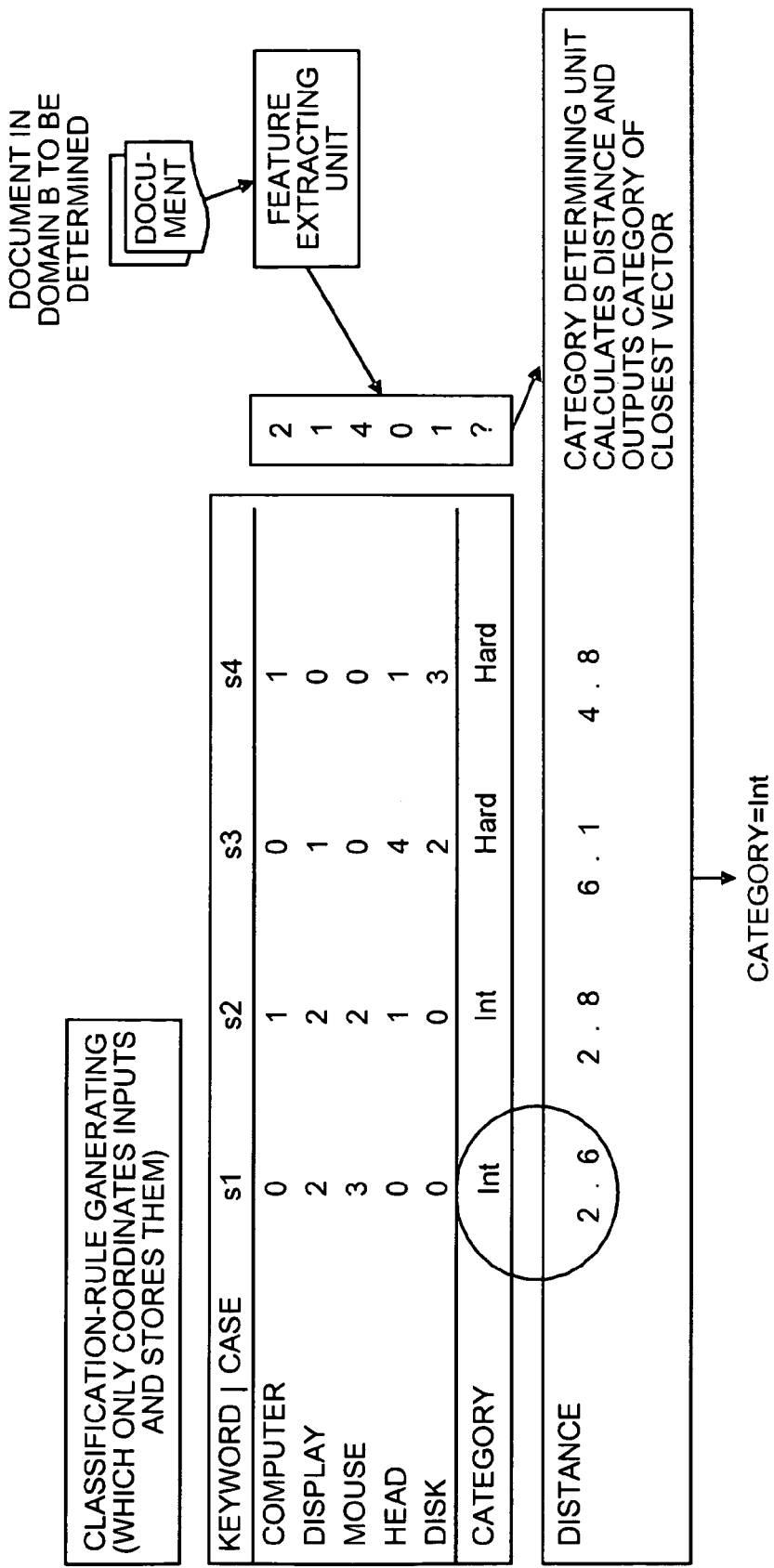
FIG. 9 is an explanatory diagram of an NN method.

FIG. 9 is an explanatory diagram of the NN method. As shown in FIG. 9, the classification-rule generating unit 118 inputs four feature vectors si ($1 \leq i \leq 4$) as the correct solution and categories "Int" and "Hard" corresponding thereto, and stores these as the classification rule. Here, "Int" indicates Interface, and "Hard" indicates Hardware. That is, in this example, the document category is classified either as Interface or Hardware.

The feature extracting unit 111 then calculates the frequency of keywords such as "computer" and "display" from the document, of which category is to be determined, to extract a feature vector, and calculates a distance between the extracted feature vector and the stored feature vector si. The feature extracting unit 111 outputs the category corresponding to the feature vector having the shortest distance as the determination result. In this example, the category "Int" corresponding to the feature vector "s1" having the shortest distance "2.6" is output as the determination result.

The processing procedure of the document classification processing by the document classification apparatus 100 according to the present embodiment will be explained. FIG. 10 is a flowchart of the processing procedure of the document classification processing by the document classification apparatus 100 according to the present embodiment.

As shown in FIG. 10, in the document classification apparatus 100, the feature extracting unit 111 reads a large number of patent documents with category (IPC) to generate feature vectors, while reading a small number of papers with category to generate feature vectors (step S101). Here, a small number means, for example, 300 items.

The category representative-point calculating unit 113 calculates the representative points of respective categories from the feature vectors in the patent domain and the paper domain (step S102), and the coordinate-transformation-rule generating unit 115 generates the coordinate transformation rule M for transforming from the feature space of the patent domain into the feature space of the paper domain by using the representative points in the patent domain and the paper domain (step S103).

The coordinate transforming unit 117 performs coordinate transformation from the feature vectors in the patent domain into the feature vectors in the paper domain by using the coordinate transformation rule M (step S104), and the classification-rule generating unit 118 generates the classification rule by using the feature vectors in the patent domain transformed into the paper domain and the categories of the patent documents corresponding to the feature vectors as the correct solutions (step S105).

On the other hand, the feature extracting unit 111 generates a feature vector from the paper, of which category is to be determined (step S106). The category determining unit 120 then determines the category of the paper from the feature vector of the paper, of which category is to be determined (step S107).

Thus, since the coordinate transforming unit 117 performs coordinate transformation from the feature vectors in the patent domain into the feature vectors in the paper domain, and the classification-rule generating unit 118 generates the classification rule by using the feature vectors in the patent domain coordinate-transformed into the paper domain, the classification rule for accurately determining the category of the paper can be generated.

Figure 11:
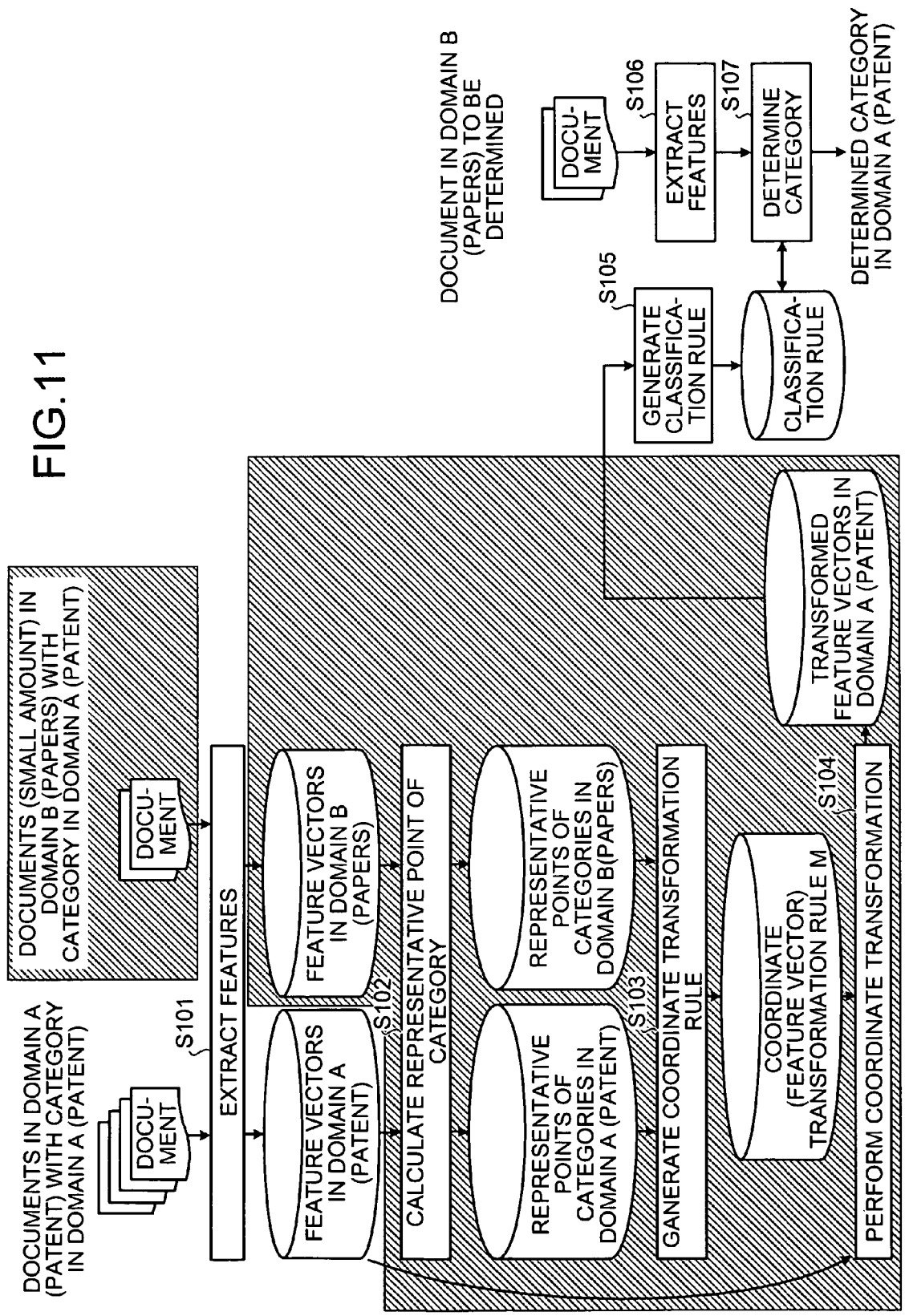
FIG. 11 is a diagram (1) depicting a difference in the document classification processing between the document classification apparatus according to the present embodiment and a conventional document classification apparatus.
Figure 12:
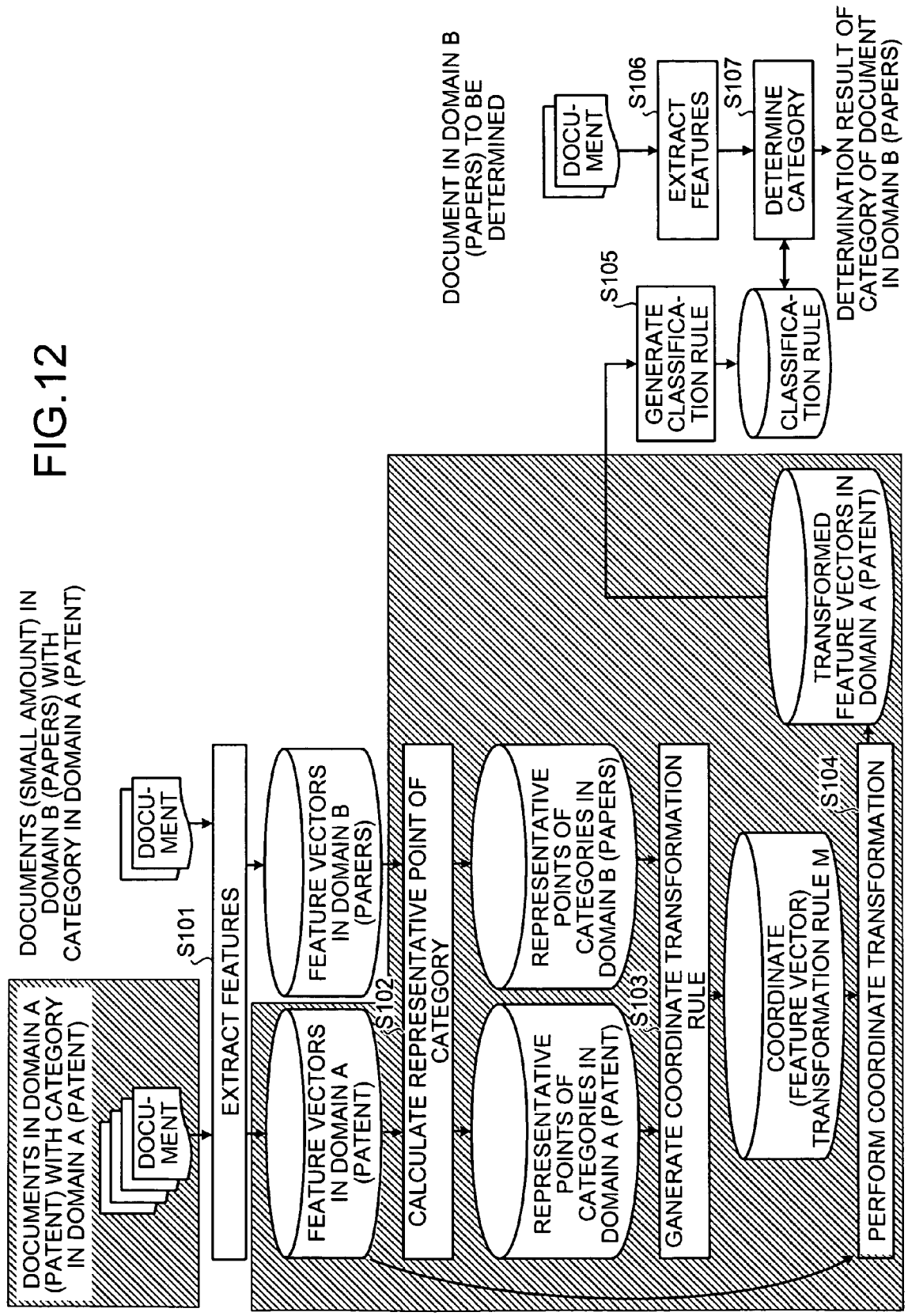
FIG. 12 is a diagram (2) depicting a difference in the document classification processing between the document classification apparatus according to the present embodiment and the conventional document classification apparatus.

A difference in the document classification processing between the document classification apparatus 100 according to the present embodiment and a conventional document classification apparatus will be explained, with reference to FIGS. 11 and 12. FIGS. 11 and 12 are diagrams (1) and (2) depicting a difference in the document classification processing between the document classification apparatus 100 according to the present embodiment and the conventional document classification apparatus.

In FIG. 11, the shaded portion indicates the processing included in the document classification processing of the document classification apparatus 100 according to the present embodiment, but not included in the document classification processing of the conventional document classification apparatus. That is, the conventional document classification apparatus generates the classification rule by directly using the feature vectors in the patent domain without transforming feature vectors in the patent domain into those in the paper domain. As a result, since the lexis is different between the patent and the papers, the papers cannot be classified accurately.

The conventional document classification apparatus shown in FIG. 12 generates the classification rule by using the feature vectors in the paper domain. At this time, since the IPC is not added to the papers, it is necessary to create the correct solution data by adding the IPC to the papers manually, thereby increasing the cost for creating a large amount of correct solution data. Accordingly, the classification rule is created from a small amount of correct solution data, and hence, the classification accuracy is low.

Thus, the document classification apparatus 100 according to the present embodiment uses the fact that there is a large quantity of patent documents added with IPC to reduce the creation cost of the correct solution data, and can improve the classification accuracy by creating the classification rule, using the patent documents transformed into the lexis in the paper domain.

As described above, according to the present embodiment, the feature extracting unit 111 generates the feature vectors in the patent domain and the paper domain, and the category representative-point calculating unit 113 calculates the representative feature vector of each of the categories in the patent domain and the paper domain. The coordinate-transformation-rule generating unit 115 generates the coordinate transformation rule for transforming the feature vectors in the patent domain into the feature vectors in the paper domain by using the representative feature vectors, and the coordinate transforming unit 117 transforms the feature vectors in the patent domain into the paper domain, by using the coordinate transformation rule. The classification-rule generating unit 118 creates the classification rule by using the feature vectors in the patent domain transformed into the paper domain, and the category determining unit 120 determines the category of the paper to be determined based on the classification rule created by using the feature vectors in the patent domain transformed into the paper domain. As a result, the category can be determined accurately.

Since the feature vectors in the paper domain are used only for calculating the representative feature vectors, the number thereof is small. Further, since it is not necessary to prepare a large number of papers with IPC for the correct solution data, the correct solution data can be prepared at a low cost.

Furthermore, according to the present embodiment, the papers are classified according to the IPC, but the present invention is not limited thereto. For example, the present invention is applicable to instances when web pages are classified according to the universal decimal classification (UDC), when news scripts are classified into categories of newspaper articles, when Japanese newspapers are classified into categories developed for English newspapers, and when articles exhibited in an auction of company B are classified into categories of an auction of company A.

Moreover, according to the present embodiment, the document classification apparatus 100 that determines the category of a document has been explained, but a vector transforming apparatus that transforms a vector in a certain coordinate space into a vector in another coordinate space can be obtained, by using a part of the functions of the document classification apparatus 100.

FIG. 13 is an explanatory diagram of the vector transforming apparatus. As shown in FIG. 13, by using the category representative-point calculation function by the category representative-point calculating unit 113, the coordinate transformation rule calculation function by the coordinate-transformation-rule generating unit 115, and the coordinate transformation function by the coordinate transforming unit 117, of the functions of the document classification apparatus 100, a vector transforming apparatus that transforms a vector between different domains classified into the same category system can be obtained.

Similarly, by using a part of the functions of the document classification apparatus 100, a lexical-distortion canceling device that cancels a lexical distortion can be obtained. FIG. 14 is an explanatory diagram of a lexical-distortion canceling device.

As shown in FIG. 14, by using the feature vector extraction function from the document by the feature extracting unit 111, the category representative-point calculation function by the category representative-point calculating unit 113, the coordinate transformation rule calculation function by the coordinate-transformation-rule generating unit 115, and the coordinate transformation function by the coordinate transforming unit 117, of the functions of the document classification apparatus 100, a lexical-distortion canceling device that cancels a lexical distortion in the document between different domains classified into the same category system can be obtained.

According to the present embodiment, the document classification apparatus has been explained, but by realizing the configuration of the document classification apparatus by software, a document classification program having the same function can be obtained. A computer that executes the document classification program will be explained below.

FIG. 15 is a block diagram of the configuration of the computer that executes the document classification program according to the present embodiment. As shown in FIG. 15, a computer 200 has a random access memory (RAM) 210, a central processing unit (CPU) 220, a hard disk drive (HDD) 230, a local area network (LAN) interface 240, an input/output interface 250, and a digital versatile disk (DVD) drive 260.

The RAM 210 stores the program and an intermediate result of execution of the program, and the CPU 220 reads the program from the RAM 210 and executes the program.

The HDD 230 stores programs and data, and the LAN interface 240 connects the computer 200 to other computers via the LAN.

The input/output interface 250 connects an input device such as a mouse and a keyboard, and a display device, and the DVD drive 260 reads from and writes into a DVD.

A document classification program 211 executed by the computer 200 is stored in the DVD, read from the DVD by the DVD drive 260, and installed in the computer 200.

Alternatively, the document classification program 211 is stored in a database of other computer systems connected via the LAN interface 240, read from the database, and installed in the computer 200.

The installed document classification program 211 is stored in the HDD 230, read by the RAM 210, and executed as a document classification process 221 by the CPU 220.

According to the present invention, since documents in the second domain are classified by using the classification rule generated based on the feature vectors in the second domain, highly accurate classification can be performed.

According to the present invention, since the feature vectors in the second domain can be easily created, the correct solution data used for the classification rule can be created at a low cost.

Furthermore, according to the present invention, since the feature vectors in the first domain are transformed into the feature vectors in the second domain accurately, highly accurate correct solution data can be obtained.

Moreover, according to the present invention, since the feature vectors in the first domain are transformed into the feature vectors in the second domain by matrix operation, transformation is easy.

Furthermore, according to the present invention, since the vocabularies used in documents are extracted as feature vectors, the classification rule can be created by using the correct solution data based on the vocabulary used in the second domain.

Moreover, according to the present invention, since a highly accurate classification rule is generated, highly accurate classification can be performed.

Furthermore, according to the present invention, since the representative vector is accurately transformed, other vectors can be also transformed highly accurately.

Moreover, according to the present invention, since the representative lexical vector is accurately transformed, other lexical vectors can be also transformed highly accurately.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores a computer program for classifying documents including words in a second domain according to categories for classifying documents including words in a first domain, wherein the computer program causes a computer to execute the process comprising:

extracting first feature vectors from the words in the documents in the first domain and extracting second feature vectors from the words in the documents in the second domain;

generating a vector transforming rule that transforms, when a word correspondence between the words in the first documents and the words in the second documents is given, the first feature vectors into the second feature vectors based on the word correspondence;

generating a classification rule that classifies the second document by the categories, by transforming a first representative vector in the category into a second representative vector in the second domain that represents a corresponding category to that in the first domain, and by corresponding the first representative feature vector and the second representative feature vector; and classifying the documents in the second domain into the categories based on the classification rule.

2. The computer-readable recording medium according to claim 1, wherein the generating a vector transforming rule includes generating a transformation matrix for transforming a matrix in which the representative feature vector calculated for each of the categories in the first domain is arranged in a column vector into a matrix in which the representative feature vector calculated for each of the categories in the second domain is arranged in a column vector, as the transformation rule.

3. The computer-readable recording medium according to claim 1, wherein the extracting includes extracting a frequency of appearance of a word in the documents as the feature vector.

4. The computer-readable recording medium according to claim 1, wherein
the extracting includes extracting more feature vectors by using more documents in the first domain, compared to the second domain, and the generating a classification rule includes generating the classification rule by using more feature vectors than the feature vectors directly extracted from the second domain, by using the feature vectors transformed.

5. A computer-readable recording medium that stores a computer program for transforming vectors in a first domain classified into a plurality of categories into vectors in a second domain classified into the categories, wherein the computer program causes a computer to execute a process comprising:
   calculating a representative vector representing a category from a plurality of vectors classified as the same category in the first and the second domains;
   generating a transformation rule for transforming the vectors in the first domain into the vectors in the second domain by using the representative vector calculated for each of the categories in the first and the second domains; and
   transforming the vectors in the first domain into the vectors in the second domain by using the transformation rule generated.

6. A computer-readable recording medium that stores a computer program for transforming lexical vectors in a first domain classified into a plurality of categories into lexical vectors in a second domain classified into the categories, wherein the computer program causes a computer to execute a process comprising:
   extracting a plurality of lexical vectors for each of the categories from a plurality of documents belonging to each of the categories in the first and the second domains;
   calculating a representative lexical vector representing each of the categories from the lexical vectors extracted in each of the categories in the first and the second domains;
   generating a transformation rule for transforming the lexical vectors in the first domain into the lexical vectors in the second domain by using the representative lexical vector calculated for each of the categories in the first and the second domains; and
   transforming the lexical vectors in the first domain into the lexical vectors in the second domain by using the transformation rule generated.

7. A method of classifying documents including words in a second domain according to categories for classifying documents including words in a first domain, the method comprising:
   extracting first feature vectors from the words in the documents in the first domain and extracting second feature vectors from the words in the documents in the second domain;
   generating a vector transforming rule that transforms, when a word correspondence between the words in the first documents and words in the second documents is given, the first feature vectors into the second feature vectors based on the word correspondence;
   generating a classification rule that classifies the second document by the categories, by transforming a first representative vector in the category into a second representative vector in the second domain that represents a corresponding category to that in the first domain, and by corresponding the first representative feature vector and the second representative feature vector; and
   classifying the documents in the second domain into the categories based on the classification rule.

8. The method according to claim 7, wherein the generating a vector transforming rule includes generating a transformation matrix for transforming a matrix in which the representative feature vector calculated for each of the categories in the first domain is arranged in a column vector into a matrix in which the representative feature vector calculated for each of the categories in the second domain is arranged in a column vector, as the transformation rule.

9. A method of transforming vectors in a first domain classified into a plurality of categories into vectors in a second domain classified into the categories, the method comprising:
   calculating a representative vector representing a category from a plurality of vectors classified as the same category in the first and the second domains;
   generating a transformation rule for transforming the vectors in the first domain into the vectors in the second domain by using the representative vector calculated for each of the categories in the first and the second domains; and
   transforming the vectors in the first domain into the vectors in the second domain by using the transformation rule generated.

10. A method of transforming lexical vectors in a first domain classified into a plurality of categories into lexical vectors in a second domain classified into the categories, the method comprising:
    extracting a plurality of lexical vectors for each of the categories from a plurality of documents belonging to each of the categories in the first and the second domains;
    calculating a representative lexical vector representing each of the categories from the lexical vectors extracted in each of the categories in the first and the second domains;
    generating a transformation rule for transforming the lexical vectors in the first domain into the lexical vectors in the second domain by using the representative lexical vector calculated for each of the categories in the first and the second domains; and
    transforming the lexical vectors in the first domain into the lexical vectors in the second domain by using the transformation rule generated.

11. An apparatus for classifying documents including words in a second domain according to categories for classifying documents including words in a first domain, the apparatus comprising:
    an extracting unit that extracts first feature vectors from the words in the documents in the first domain, and extracts second feature vectors from the words in the documents in the second domain;
    a vector transforming rule generating unit that generates a transforming rule that transforms, when a word correspondence between the words in the first documents and words in the second documents is given, the first feature vectors into the second feature vectors based on the word correspondence;
    a classification rule generating unit that generates a classification rule that classifies the second document by the categories, by transforming a first representative vector in the category into a second representative vector in the second domain that represents a corresponding category to that in the first domain, and by corresponding the first representative feature vector and the second representative feature vector; and
    a document classifying unit that classifies the documents in the second domain into the categories based on the classification rule.

12. The apparatus according to claim 11, wherein the transformation-rule generating unit generates a vector transforming matrix for transforming a matrix in which the representative feature vector calculated for each of the categories in the first domain is arranged in a column vector into a matrix in which the representative feature vector calculated for each of the categories in the second domain is arranged in a column vector, as the transformation rule.

13. An apparatus for transforming vectors in a first domain classified into a plurality of categories into vectors in a second domain classified into the categories, the apparatus comprising:
- a representative-vector calculating unit that calculates a representative vector representing a category from a plurality of vectors classified as the same category in the first and the second domains;
- a transformation-rule generating unit that generates a transformation rule for transforming the vectors in the first domain into the vectors in the second domain by using the representative vector calculated for each of the categories in the first and the second domains; and
- a transforming unit that transforms the vectors in the first domain into the vectors in the second domain by using the transformation rule generated.

14. An apparatus for transforming lexical vectors in a first domain classified into a plurality of categories into lexical vectors in a second domain classified into the categories, the apparatus comprising:
- a lexis extracting unit that extracts a plurality of lexical vectors for each of the categories from a plurality of documents belonging to each of the categories in the first and the second domains;
- a representative-lexical-vector calculating unit that calculates a representative lexical vector representing each of the categories from the lexical vectors extracted in each of the categories in the first and the second domains;
- a transformation-rule generating unit that generates a transformation rule for transforming the lexical vectors in the first domain into the lexical vectors in the second domain by using the representative lexical vector calculated for each of the categories in the first and the second domains; and
- a transforming unit that transforms the lexical vectors in the first domain into the lexical vectors in the second domain by using the transformation rule generated.

* * * * *